United States Patent
Prerre

(10) Patent No.: US 6,225,371 B1
(45) Date of Patent: May 1, 2001

(54) REFLECTIVE THOROUGHFARE PAVEMENTS OR RELATED ELEMENTS, AND CORRESPONDING COMPOSITION

(75) Inventor: Bense Prerre, Limeil-Brevannes (FR)

(73) Assignee: Colas, Boulogne Brilliancourt (FR)

( * ) Notice: Subject to any disclaimer, the term of this patent is extended or adjusted under 35 U.S.C. 154(b) by 0 days.

(21) Appl. No.: 09/442,329

(22) Filed: Nov. 17, 1999

(30) Foreign Application Priority Data

Oct. 27, 1997 (FR) .................................................. 97 13452

(51) Int. Cl.$^7$ ................ C08L 95/00; C08K 3/40
(52) U.S. Cl. ................ 523/172; 106/281.1; 106/284.01; 106/284.02; 106/284.03; 523/214; 524/494
(58) Field of Search ........................... 106/281.1, 284.01, 106/284.02, 284.03, 676, 688, 691, 784, 814; 523/172, 214; 524/494

(56) References Cited

U.S. PATENT DOCUMENTS

| | | | |
|---|---|---|---|
| 5,437,907 | 8/1995 | Peil et al. | 523/172 |
| 5,445,880 | * 8/1995 | Martiny | 524/914 |

FOREIGN PATENT DOCUMENTS

| | | |
|---|---|---|
| 544 423 | 1/1956 | (BE) . |
| 899 935 | 10/1985 | (BE) . |
| 323 853 | 8/1957 | (CH) . |
| 2 279 957 | 1/1995 | (GB) . |
| 43 24 190 | 1/1995 | (DE) . |
| 38 958 | 9/1960 | (LU) . |
| 95 22 662 | 8/1995 | (WO) . |

* cited by examiner

*Primary Examiner*—Peter Szekely
(74) *Attorney, Agent, or Firm*—Sughrue, Mion, Zinn, Macpeak & Seas, PLLC

(57) ABSTRACT

The invention relates to pavements for thoroughfares and related safety and/or marking elements having enhanced reflective properties, comprising 10 to 80% by weight of glass debris which contains at least 10% by weight of essentially reflective glass debris less than 20 mm in size.

It also relates to a composition for such thoroughfare pavements or related elements.

The invention applies more particularly to the construction of thoroughfares such as roads, cycle tracks, walkways, etc. or related elements such as concrete crash barriers, curbs of pedestrian pavements, bollards, etc.

23 Claims, No Drawings

REFLECTIVE THOROUGHFARE PAVEMENTS OR RELATED ELEMENTS, AND CORRESPONDING COMPOSITION

BACKGROUND OF THE INVENTION

The present invention relates to the construction of thoroughfares such as roads, cycle tracks, walkways, etc. or the manufacture of safety and/or marking elements related to thoroughfares, such as concrete crash barriers, curbs of pedestrian pavements, marking bollards, etc. which possess enhanced reflective properties.

It relates more particularly to a composition for thoroughfare pavements or for related safety and/or marking elements allowing such properties to be obtained.

It also relates to the thoroughfare pavements and the related safety and/or marking elements obtained from these compositions.

Safety, particularly road safety, is a fundamental issue; certain thoroughfares or parts of thoroughfares, or elements that mark out or protect specific areas, must be clearly visible in order to draw the attention of a user, be he a motor-vehicle driver, cyclist or pedestrian, to a possible danger or merely just to guide him.

In order to distinguish between thoroughfares, it is general practice to exploit the various colours that can be obtained depending on the types of surface (bitumen, concrete, etc.) or the possibility of giving the surface a lighter appearance by the use of a particular aggregate, especially light-coloured chippings.

In the field of markings, particularly road markings, reflective paints or marking bands which contain glass microspheres are known.

It has also been proposed to incorporate glass microspheres into road pavements.

These microspheres must have specific characteristics, especially light-reflection characteristics, and must have, for example, a defined shape in order for light, such as that coming from motor-vehicle headlights, to be reflected satisfactorily.

These microspheres thus have to be manufactured using expensive specific processes, which limits their applications, in particular to small areas.

It has also been proposed to use recovered glass of the bottle type to construct road pavements, by incorporating it into the surface using compactor rollers after the construction proper of the pavement while it is still soft.

However, the glass debris thus applied does not allow satisfactory reflective properties to be achieved, particularly in very poorly lit areas.

In addition, there is a high risk of it being broken up, by the traffic and scattered in places where it can no longer produce the reflection effect.

SUMMARY OF THE INVENTION

The object of the present invention is to provide a means of improving the discernibility and visibility of thoroughfares.

The object of the present invention is also to provide pavements for thoroughfares or related safety and/or marking elements having enhanced photometric properties.

Another object is also to provide such pavements or related elements at a reduced cost.

For these purposes, a more specific object of the invention is to provide a composition for thoroughfare pavements and/or related safety and/or marking elements having enhanced reflective properties, characterized in that the composition comprises 10 to 80% by weight of glass debris which contains at least 10% by weight of essentially reflective glass debris less than 20 mm in size.

A further object of the invention is to provide thoroughfare pavements and/or related safety and/or marking elements having enhanced reflective properties, characterized in that they comprise 10 to 80% by weight of glass debris which contains at least 10% by weight of essentially reflective glass debris less than 20 mm in size.

The invention also relates to pavements and related safety and/or marking elements obtained from the aforementioned compositions.

According to the invention, the expression "essentially reflective glass debris" should be understood to mean special glass debris having essentially reflective properties as opposed to ordinary glass debris which is transparent or translucent and whose reflection properties are not of primary importance.

The special glass debris employed according to the invention generally comes from glass that has undergone a treatment, for example a metallization treatment, to heighten its reflective properties.

Among the types of glass that can be used according to the invention, mention may be made of conventional mirrors, metallized glass and enamelled glass.

Glass having at least one metallized surface, especially glass for the building industry such as Antélio® glass, can also be used according to the invention, as can glass with metal inclusions such as vehicle rear window glass containing a metal filament for defrosting.

As a variant, it may be envisaged to use ceramic glass or fired glass, or motor-vehicle glass such as "antidazzle" tinted window glass, or safety glass of the Securit® type.

The glass used according to the invention may come from manufacturing scrap or from the recovery of materials from vehicles, building demolition, etc.

When the term "glass" is used by itself it denotes any type of glass as a mixture, that is to say mixtures of different types of special glass or mixtures of ordinary glass, of the bottle or window type, with special glass, or else computer screen glass.

It is also possible to use other types of glass, especially computer screen glass, as a mixture with special glass.

The glass, whether new or scrap, is broken and crushed by any known means until debris having a size of less than 20 mm, preferably having a size ranging from 2 to 10 mm and even more preferably from 2 to 6 mm, are obtained.

According to the invention, the composition may contain mixtures of ordinary glass debris and special glass debris.

The composition preferably contains from 20 to 50% by weight of glass debris.

The glass debris preferably contains from 30 to 50% by weight of essentially reflective glass debris as defined above.

The proportions of the special glass debris will be adapted according to the reflectivity it is desired to obtain.

The relevant reflective properties according to the invention are the reflection of light in the visible range, especially illuminating light (for example, street lighting, tunnel lighting, etc.), vehicle lights (headlights, etc.) or natural light.

The invention relates to the pavements of substantially horizontal surfaces, such as thoroughfares, especially roadways, cycle tracks, pedestrian pavements and other walkways, car parks and parking lots.

The composition is therefore manufactured in a conventional manner, but with the additional incorporation of glass debris being provided.

The pavement composition may thus comprise a bituminous binder, especially for bituminous concretes, in which case the glass debris is coated, hot or cold, as is conventionally done to natural rock chippings.

For this type of pavement, it is advantageous to use thin bituminous concretes, for example with a thickness of about 2 to 4 centimetres, or else draining bituminous concretes.

In the case of a cold bituminous binder, the pavements may be of the cold poured mix (CPM) type, the glass debris being coated with bituminous emulsion and the liquid mix spread out over the thoroughfare.

Provision may also be made for the conventional cold-mix composition to be spread and then for the glass debris to be spread over the surface before the pavement has hardened.

Pavements may also be obtained by surface coatings. In this case, the bituminous base layer is partially or completely gritted with the glass debris, like those mentioned above, the latter complementing or replacing the usual chippings.

The composition may also comprise a hydraulic binder, as in the case of cement mortars and cement concretes. Some of the sand and/or aggregate is simply replaced with the grass debris provided according to the invention.

Provision may advantageously be made for the glass debris to be incorporated subsequently, especially by dispersion or spraying, after the concrete has been laid but before it has hardened.

The invention also applies to compositions having a binder of the polymer or synthetic-resin type which are able to be used for certain pavements, especially pedestrian pavements.

The invention aslo relates to substantially vertical surfaces, as opposed to the previous ones, essentially those encountered in safety and/or marking elements related to thoroughfares.

For example, these are concrete crash barriers, curbs of pedestrian pavements, marking studs, central bollards or strips for separating specific lanes, such as bus lanes.

The glass debris according to the invention may be incorporated into the base composition as described above in the case of the pavements of substantially horizontal surfaces.

The elements may be manufactured on site or prefabricated, as is conventionally done.

Depending on the type of element and especially on its dimensions, provision may be made for the glass debris to be incorporated throughout the thickness or only on the surface, for example by subsequent addition or localized incorporation before casting.

In the case of concrete crash barriers, provision may advantageously be made for the glass debris to be incorporated after the actual casting of the barrier, while the concrete has yet to harden.

Provision may advantageously be made for the glass debris to receive a prior treatment in order to promote its adhesion to the binder used (bitumen, cement or resin). This treatment may, for example, be carried out using adhesion promoters such as silanes.

Moreover, provision may advantageosuly be made for the pavement or element, after it has been formed, to receive a final surface treatment intended to reveal the glass debris on the surface, which debris had previously been covered with binder.

The traffic may also participate in this.

The manufacture of safety and/or marking elements related to thoroughfares having enhanced reflective properties according to the invention advantageously allows the photometric properties of the material to be better exploited since the angle between the illuminated surface and the direction of the light source, for example the headlights of vehicles, is much larger.

By way of example, it may be pointed out that motor-vehicle headlights illuminate the road at an angle of approximately 2° in normal operation, whereas in relation to curbs of pedestrian pavements the angle is between 60 and 120°.

According to one of its aspects, the invention therefore relates to throughfare pavements and to related safety and/or marking elements comprising glass debris in the proportions and sizes mentioned beforehand for the compositions.

The invention has, in particular, the following advantages:

from the road safety standpoint, it allows the visibility of the pavement surface to be improved when the illumination is insufficient or in places of danger (crossroads, bends, pedestrian crossings, etc.);

from the standpoint of artificial illumination, it allows savings to be made therein;

from the standpoint of the directing and marking of lanes, it allows reserved lanes, such as bus lanes, cycle tracks, etc., to be discerned;

from the economic standpoint, it allows a satisfactory reflecting effect to be obtained with relatively little material, which material furthermore does not require special manufacture and cannot in general be easily recycled;

from the standpoint of aesthetic appearance, it also allows certain areas (squares, tourist routes, etc.) to be highlighted.

The invention will be described with reference to the examples of compositions, given below by way of non-limiting illustration.

DETAILED DESCRIPTION OF THE INVENTION

EXAMPLES

Example 1

Concrete for curbs of Pedestrian Pavements

| A concrete of the following composition is prepared: | |
|---|---|
| 5/15 river gravel aggregate | 1300 kg |
| 0/5 special glass sand | 300 kg |
| rolled river sand | 300 kg |
| CPA 55 cement | 150 kg |
| water and admixture | 150 l |

The mix is cast in order to obtain prefabricated concrete curbs.

Example 2

Prefabricated motorway borders for channelling water, made of synthetic material of the general type described in Application EP-A-0,648,896.

The following mix is prepared:

| | |
|---|---|
| 2/4 reclaimed rubber particles | 56% by weight |
| 4/6 crushed special glass | 37% by weight |
| polyurethane resin | 7% by weight |

The mix is agglomerated and cast as described in the abovementioned patent application.

Example 3
0/10 Semi-Coarse Hot Mix

The following mix is prepared:

| | |
|---|---|
| 6/10 diorite gravel aggregate | 23% by weight |
| 2/6 crushed special glass | 38% by weight |
| 0/2 diorite sand | 37% by weight |
| filler fines (stone dust) | 2% by weight |
| bitumen | 5.8 pp (parts per hundred) |

The mix is compacted hot in a conventional manner to a thickness of 5 cm.

Example 4
0/6 Very-Thin Hot Overlay

The following mix is prepared:

| | |
|---|---|
| 4/6 diorite gravel aggregate | 65% by weight |
| 0/6 crushed special glass | 30% by weight |
| filler fines | 5% by weight |
| bitumen | 5.5 pph |

Example 5
Poured Cold Mix

The following mix is prepared:

| | |
|---|---|
| quarzite sand | 50% by weight |
| 0/6 special glass sand | 50% by weight |
| 65% bitumen emulsion | 12 pph |
| make-up water with additive | 2 pph |

The liquid mix obtained is spread to a thickness of 1 to 2 centimetres and left to dry for 15 to 30 minutes before being reopened to traffic.

What is claimed is:

1. A composition for thoroughfare surfacings or related safety and/or marking elements having enhanced reflective properties, which comprises:
   10 to 80% by weight of glass debris which contains at least 10% by weight of essentially reflective glass debris possessing at least one metallized or enamelled surface or containing metal inclusions, the debris being less than 20 mm in size; and
   a bituminous binder.

2. The composition as claimed in claim 1, which comprises 20 to 50% by weight of glass debris.

3. The composition as claimed in claim 1, wherein the glass debris contain between 30 and 50% of essentially reflective glass debris.

4. The composition as claimed in claim 1, wherein the glass debris has a size ranging from 2 to 10 mm.

5. The composition as claimed in claim 4, wherein the glass debris has a size ranging from 2 to 6 mm.

6. The composition as claimed in claim 1, wherein the essentially reflective glass debris is mirror-glass, building glass, or motor-vehicle window-glass.

7. The composition as claimed in claim 1, wherein the composition is for use in a bituminous concrete, a cold poured mix or a surface coating.

8. The composition as claimed in claim 1, wherein the glass debris contains an adhesion promoter.

9. A surfacing for thoroughfares including, but not limited to, roads, cycle tracks, foot pavements and walkways, car parks and parking lots, said surfacing exhibiting enhanced reflective properties, and having a composition comprising:
   a bituminous binder, and
   10 to 80% by weight of glass debris which contains at least 10% by weight of essentially reflective glass debris, possessing at least one metallized or enameled surface or containing metal inclusions, the debris being less than 20 mm in size.

10. The surfacing as claimed in claim 9, comprising 20 to 50% by weight of glass debris.

11. The surfacing as claimed in claim 9, wherein the glass debris contains between 30 and 50% of essentially reflective glass debris.

12. The surfacing as claimed in claim 9, which has essentially reflective glass debris at least in its surface layer.

13. The composition as claimed in claim 1, which comprises 5.8% of bituminous binder, the remaining part of the composition containing 38% of glass debris and 62% of aggregates.

14. The composition as claimed in claim 1, which comprises 5.5% of bituminous binder, the remaining part of the composition containing 30% of glass debris and 70% of aggregates.

15. The composition as claimed in claim 1, which comprises 12% of 65% emulsion of a bituminous binder, the remaining part of the composition comprising 50% of glass debris and 50% of aggregates.

16. The surfacing as claimed in claim 9, wherein the glass debris has a size ranging from 2 to 10 mm.

17. The surfacing as claimed in claim 16, wherein the glass debris has a size ranging from 2 to 6 mm.

18. The surfacing as claimed in claim 9, wherein the essentially reflective glass debris is mirror-glass, building glass, or motor-vehicle window-glass.

19. The surfacing as claimed in claim 9, wherein said composition is for use in a bituminous concrete, a cold poured mix or a surface coating.

20. The surfacing as claimed in claim 9, which comprises 5.8% of bituminous binder, the remaining part of the composition containing 38% of glass debris and 62% of aggregates.

21. The surfacing as claimed in claim 9, which comprises 5.5% of bituminous binder, the remaining part of the composition containing 30% of glass debris and 70% of aggregates.

22. The surfacing as claimed in claim 9, which comprises 12% of 65% emulsion of a bituminous binder, the remaining part of the composition comprising 50% of glass debris and 50% of aggregates.

23. The surfacing as claimed in claim 9, which comprises a bituminous concrete, with a thickness of about 2 to 4 centimeters, or draining bituminous concretes.

* * * * *

UNITED STATES PATENT AND TRADEMARK OFFICE
CERTIFICATE OF CORRECTION

PATENT NO. : 6,225,371 B1 Page 1 of 1
DATED : May 1, 2001
INVENTOR(S) : Pierre Bense It is certified that error appears in the above-identified patent and that said Letters Patent is hereby corrected as shown below:

<u>Title page,</u>
Item [30] Foreign Application Priority Data
    NONE

Signed and Sealed this

Nineteenth Day of February, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,225,371 B1
DATED : May 1, 2001
INVENTOR(S) : Pierre Bense

It is certified that error appears in the above-identified patent and that said Letters Patent is hereby corrected as shown below:

<u>Title page,</u>
Correct as follows:
Item [75] Inventor, Pierre Bense, Limeil-Brevannes ( FR)
Item [73] Assignee, Colas, Boulogne Billancourt (FR)

Signed and Sealed this

Twenty-first Day of May, 2002

Attest:

*Attesting Officer*

JAMES E. ROGAN
*Director of the United States Patent and Trademark Office*